No. 817,571. PATENTED APR. 10, 1906.
N. B. JARRIEL.
STAY BOLT FOR BOILERS.
APPLICATION FILED SEPT. 25, 1905.

WITNESSES
Paul J. Gathmann
M. E. Burnell

INVENTOR
N. B. Jarriel
BY HIS ATTORNEYS
Baldwin Wight

UNITED STATES PATENT OFFICE.

NATHAN B. JARRIEL, OF MANASSAS, GEORGIA.

STAY-BOLT FOR BOILERS.

No. 817,571.  Specification of Letters Patent.  Patented April 10, 1906.

Application filed September 25, 1905. Serial No. 280,013.

*To all whom it may concern:*

Be it known that I, NATHAN B. JARRIEL, a citizen of the United States, residing at Manassas, in the county of Tattnall and State of Georgia, have invented certain new and useful Improvements in Stay-Bolts for Boilers, of which the following is a specification.

The object of my invention is to provide an improved substitute for the stay-bolts now commonly employed to connect and hold in proper relation the sheets or plates of steam-boilers and other like structures.

In the use of the old style of stay-bolts much difficulty was encountered in providing an arrangement which would be sufficiently strong, would be simple, and would not leak, and attempts have been made to overcome these objections and difficulties; but so far as I am aware no device has heretofore been produced which, while simple in construction, can be easily applied and will not leak.

According to my invention I construct a stay-bolt in two parts, one of which comprises a threaded tapered head and a threaded shank and the other of which consists of a threaded tapered nut or plug having a threaded bore or socket to receive the shank. Both members of the stay-bolt have angular bosses to receive a wrench or other suitable tool, and the threaded parts of the two members are adapted to enter tapered holes in the boiler-sheets.

Figure 1:
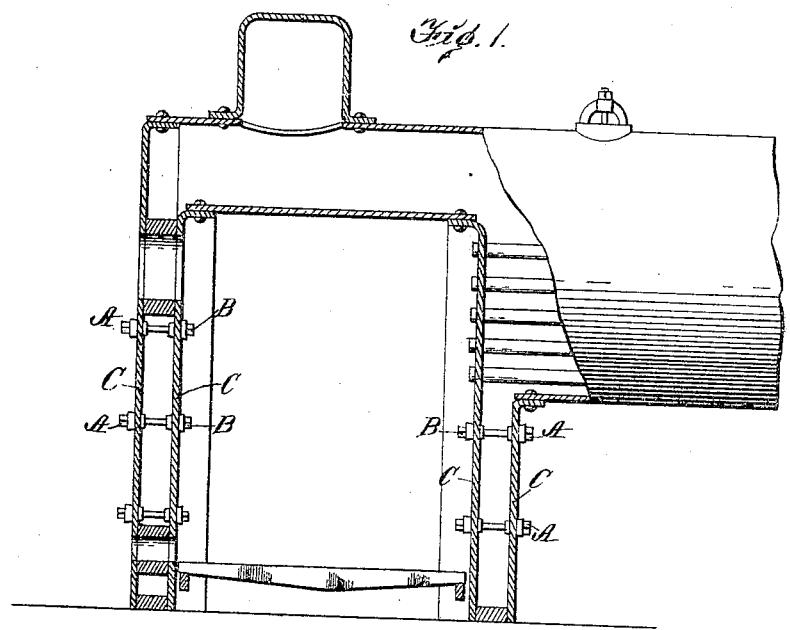
Figures 2, 3, 4:
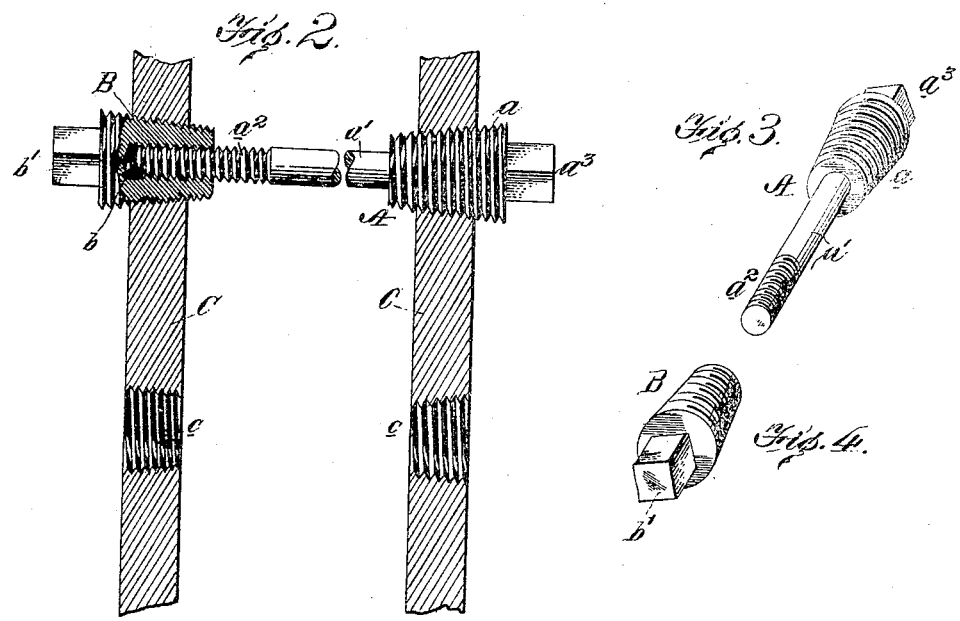

In the accompanying drawings, Figure 1 is a view, partly in vertical section and partly in side elevation, of a part of a steam-boiler with my improvements applied. Fig. 2 is a view, on an enlarged scale, partly in section and partly in elevation, more clearly indicating the construction of my improved stay-bolt and the manner of applying it. Fig. 3 is a perspective view of one member of the stay-bolt, and Fig. 4 is a perspective view of the other member.

In Fig. 1 I have shown a conventional type of steam-boiler with my improved stay-bolts applied around the fire-box. It will be understood, however, that they may be applied to other parts of the boiler. These stay-bolts comprise two members A and B. The member A consists of a threaded tapered head $a$ and a shank $a'$, threaded at its outer portion $a^2$. The head carries an angular boss $a^3$, adapted to receive a wrench or other suitable tool. The member B consists of a tapered hollow plug or nut threaded on its exterior and also threaded in its bore $b$ to receive the threaded part $a^2$ of the shank $a'$. It also has an angular boss $b'$, similar to the boss $a^3$ and for the same purpose.

In applying the stay-bolts to a boiler tapered holes $c$ are formed in the sheets or plates C, and these holes are threaded to receive the threaded head $a$ and the threaded plug B. The plug is inserted and screwed home in one of the sheets, and then the shank $a'$ is passed through a hole $c$ in the opposite sheet and made to enter the socket $b$ in the plug B. Then the member A is turned by a wrench or other tool until the shank is screwed home in the socket and the head $a$ has passed through the hole $c$. In other words, the plug B is attached to a sheet C in the manner indicated in Fig. 2, so that its outer end extends a short distance beyond the inner face of the sheet, and then the member A is made to engage the opposite sheet and the plug B in the manner indicated. This operation is extremely simple and not only results in firmly connecting the members, but also efficiently stays the boiler-sheets and prevents leaks. It is evident that there can be no leak around the threaded portion $a^2$ of the shank, because the outer end of the bore or socket $b$ is closed. If there is a tendency to leak around the tapered head and plug, such leakage may be stopped by giving slight turns to the plug and head.

These stay-bolts can be used in place of the old style in constructing new boilers or they may be employed to replace them in old boilers, it being only necessary in the case of old boilers to form the tapered holes $c$ to receive the head $a$ and plug B. These bolts may also be used to apply patches on boilers and for repairs generally and may be made in any desired sizes.

It will be observed that no hammering is required in applying these bolts. It is not necessary to form heads on the ends of the bolts, as the connections made with the sheets and between the two members of the bolt are strong and durable. At the same time any expansion or contraction may be quickly compensated for by an adjustment of the members without danger of leakage.

I claim as my invention—

1. A stay-bolt, comprising a member having a threaded tapered head and a threaded shank formed integrally therewith, and a member which is tapered and threaded on its exterior and has a threaded bore or socket closed at its outer end to receive the said shank.

2. The combination with boiler sheets or plates having tapered threaded holes of a stay-bolt, comprising two members, one of which consists of a tapered, threaded head, provided with an angular boss and formed integrally with a threaded shank, and the other of which consists of a tapered plug threaded on its exterior and having a threaded socket to receive the threaded shank.

In testimony whereof I have hereunto subscribed my name.

NATHAN B. JARRIEL.

Witnesses:
W. R. PHILLIPS,
ST. JAS. B. ALEXANDER.